June 13, 1933.  J. H. ASHBAUGH  1,914,095
REGULATOR SYSTEM
Filed Nov. 17, 1930
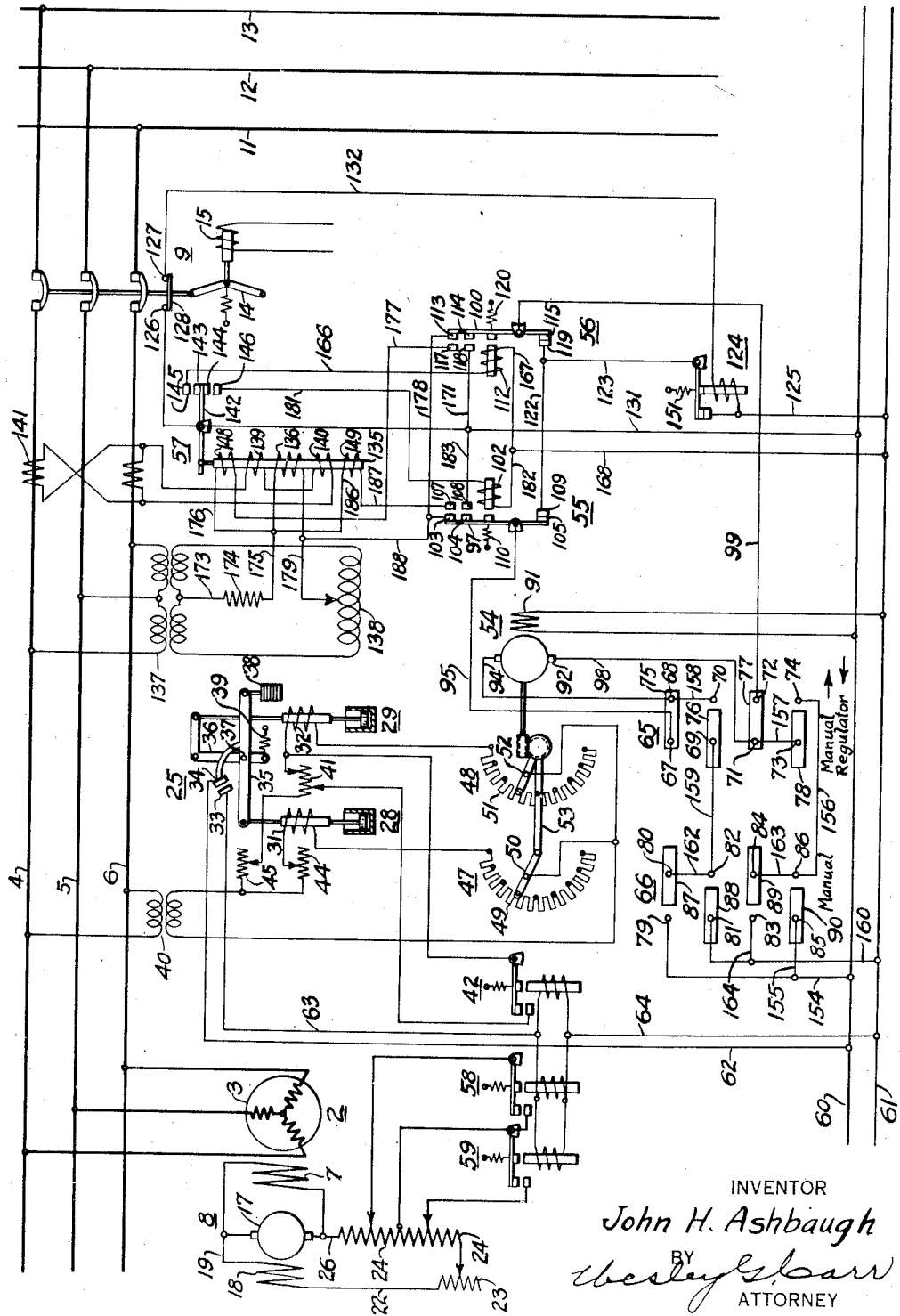
INVENTOR
John H. Ashbaugh
BY
ATTORNEY Patented June 13, 1933

1,914,095

UNITED STATES PATENT OFFICE

JOHN H. ASHBAUGH, OF PITTSBURGH, PENNSYLVANIA, ASSIGNOR TO WESTINGHOUSE ELECTRIC & MANUFACTURING COMPANY, A CORPORATION OF PENNSYLVANIA

REGULATOR SYSTEM

Application filed November 17, 1930. Serial No. 496,236.

My invention relates to regulator systems and it has particular relation to regulator systems for governing electrical quantities of dynamo-electric machines.

Frequently, power consumers, such as manufacturing concerns, operate small power plants that are connected to large power systems from which a portion of their power is purchased. The power company usually offers lower rates for better power factor load demands. That is, the rate for purchased power is not based alone on kilowatt demand, but also on the maintenance of power factor within certain limits. It is, therefore, desirable to so control the excitation of the generators in the small power plant as to govern the power factor of the purchased power, when the two sources of power are connected together.

When the local power plant is operating disconnected from the large power system, voltage regulation of the plant is desired. It will therefore be seen that it is desirable to provide a voltage regulator for governing the excitation of the generators in the local plant when it is operated disconnected from the power system and a power-factor regulator for governing the excitation of the generators when they are connected to the power system. It is also desirable to provide for automatically transferring the control from one regulator to the other in accordance with whether or not the local plant is connected to the power system.

An object of my invention is the provision of a regulator system that shall regulate for constant voltage on a power station when the station is operating isolated, and that shall regulate for constant power factor at a predetermined value in the connecting circuit when it is operating connected to a second source.

Where the bus bars of a power station are supplied with power from two sources, such as a synchronous generator and a separate power system, it is possible to maintain the power factor from one of these sources, such as the power system, within a predetermined value by so varying the excitation of the generator as to overcome the effect of the power factor of the load thereon.

My invention contemplates a voltage regulator as the primary means of control of the excitation of an alternating current generator connected to bus bars in a power station that is adapted to be connected to a second source of power. Motor-operated rheostats are provided to adjust the setting of the regulator to vary the excitation of the generator. Means are provided for manually controlling the operation of the motor when the station is operating isolated and means are provided to transfer the control of the motor to a power-factor regulator, when the station is connected to the second source of power. The power-factor regulator is responsive to the power factor of the power delivered to the station and controls the operation of the voltage to maintain the power factor of the delivered power at a predetermined value.

My invention will be better understood from the following description when read in conjunction with the accompanying drawing, in which the single figure is a diagrammatic view of apparatus and circuits employed in one preferred embodiment of my invention.

Referring to the drawing an alternating-current generator 2, representing a local power plant, is illustrated as comprising an armature winding 3 that is connected to station bus bars 4, 5 and 6 and a field winding 7 that is connected to be energized from an exciter generator 8. The bus bars may be connected by means of an auxiliary circuit through a circuit breaker 9 to a power transmission system represented by conductors 11, 12 and 13. Mechanism 14 for actuating the circuit breaker 9 is operated by an electro-magnet 15. As the mechanism for controlling the electro-magnet forms no part of this invention it is deemed unnecessary to illustrate or describe it.

The exciter generator 8 is provided with an armature winding 17 and a field winding 18. The circuit of the field winding 18 may be traced from one terminal of the armature winding 17, through conductor 19, the field winding 18, conductor 22, a resistor 23, a regulating resistor 24, that is controlled by a regulator 25, and conductor 26 to the other terminal of the armature winding 17.

The regulator 25 which may be of any suitable type, is illustrated as a vibrating regulator, and comprises a pair of electromagnets 28 and 29 having operating windings 31 and 32, respectively, for controlling the engagement of contact members 33 and 34. The contact member 33 is mounted in a fixed position and cooperates with the movable contact member 34 that is carried by a lever 35. The lever 35 is pivotally connected, at its left-hand end, to the electromagnet 28 and is carried by a bell-crank lever 36 upon which it is pivotally mounted at 37. The lever 36 is connected at its right-hand end to be actuated by the electromagnet 29. The weight of the electro-magnet core 28 is partially balanced by a weight 38 attached to the right-hand end of the lever 35 and the weight of the electro-magnet 29 is partially balanced by a biasing member 39 attached to the bell-crank lever 36.

The windings 31 and 32, when energized, actuate the electro-magnets 28 and 29 respectively, upwardly against the pull of their associated dash-pots, thus causing disengagement of the contact members 33 and 34. The regulator windings 31 and 32 are energized in accordance with the voltage of the bus bars through the agency of a voltage transformer 40. A resistor 41 is provided in circuit with the winding 32 and is short-circuited by a relay 42 upon the engagement of the regulator contact members 33 and 34, thus giving a vibratory action to the magnet 29. A manually adjustable resistor 44 is connected in series-circuit relation with the winding 31 for adjusting the voltage that it is desired the regulator should maintain upon the bus bars. A similar resistor 45 may be provided in series-circuit relation with the winding of the electro-magnet 29.

Motor-operated rheostats 47 and 48 are connected in series-circuit relation to the windings 31 and 32 respectively, to further adjust the setting of the regulator 25. The rheostat 47 comprises a resistor 49 and a movable contact arm 50, and the rheostat 48 comprises a resistor 51 and a movable contact arm 52. The contact arms 50 and 52 of the two rheostats are mechanically connected together by any suitable means, such as a shaft 53, and are connected to be simultaneously operated by a pilot motor 54 that is controlled by reversing switches 55 and 56 in accordance with the operation of a power factor regulator 57.

The regulator 25 controls a group of relays 42, 58 and 59 that have their operating windings connected in parallel-circuit relation. Upon the engagement of the contact members 33 and 34 a circuit is completed to connect the operating windings of the relays 42, 58 and 59 to supply conductors 60 and 61, causing each of them to close a circuit through their associated contact members. The operating circuit for the relays extends from the conductor 60, through conductor 62, the contact members 34 and 33, conductor 63, the operating windings of the relays and conductor 64 to the other supply conductor 61.

The relay 42 which short-circuits the resistor 41 upon engagement of the regulator contact members causes an increase in the excitation of the winding 32. The electromagnet 29 is thus actuated upwardly to cause the pivot point 37 to be moved toward the right to disengage the contact members 33 and 34. The contact members 33 and 34 will thus be brought into and out of engagement with each other for greater or lesser periods of time depending upon the variations of the voltage of the bus bars. The relays 58 and 59 control the effective value of the resistor 24 by intermittently short-circuiting the resistor in accordance with the operation of the regulator 25 thus controlling the excitation of the field winding 18 within a given range of operation depending upon the resistance of the resistor 24.

In order to control the excitation of the generator to control the power factor of the power delivered to the station in response to the operation of the power-factor regulator when the station is operating connected to the transmission system, and also to permit the station operator to adjust the setting of the rheostats 47 and 48 for whatever value of excitation is desired when the station is operating disconnected from the system, transfer switches 65 and 66 are provided.

The transfer switch 65 transfers the control of the pilot motor 54 from the power-factor regulator 57, to the manually controlled switch 66 and comprises a plurality of stationary contact terminals 67, 68, 69, 70, 71, 72, 73 and 74 and a plurality of movable contact segments 75, 76, 77 and 78. The segments 75 and 77 connect the terminals 67—68 and 71—72, respectively, when the switch is in the illustrated position and the segments 76 and 78 connect the terminals 69—70 and 73—74, respectively, when the switch is in the alternate position.

The switch 66 controls the operation of the motor 54 when the transfer switch 65 is in the alternate position and is similar in construction to the switch 65 comprising a plurality of stationary contact terminals 79, 80, 81, 82, 83, 84, 85 and 86 and a plurality of movable contact segments 87, 88, 89, and 90.

The pilot motor 54 comprises a field winding 91 that is connected to be energized from the supply conductors 60 and 61 and with an armature winding 92. One terminal of the armature winding 92 is connected by means of a conductor 94 the contact terminal 68, the contact segment 75 and contact terminal 67 of the switch 65, and conductor 95 to the movable contact arm 97 of the reversing switch 55. The other terminal of the armature winding 92 is connected by means of a conductor 98, the contact terminal 71 the contact segment 77 and the contact terminal 72 of the switch 65, and conductor 99 to the movable contact arm 100 of the reversing switch 56.

The reversing switch 55 comprises the movable contact arm 97 and an electro-magnet 102, the arm 97 carrying movable contact members 103, 104, and 105 that cooperate respectively with stationary contact members 107, 108 and 109. A biasing member 110 is provided for normally holding the cooperating contact members 105 and 109 in engagement. The reversing switch 56 is similar in construction to the switch 55 and comprises the movable contact arm 100 and an electro-magnet 112, movable contact members 113, 114 and 115 that cooperate with stationary contact members 117, 118 and 119, respectively, and a biasing member 120 for normally holding the contact members 115 and 119 in engagement.

The stationary contact members 109 and 119 of the reversing switches 55 and 56, respectively, are connected by means of a conductor 122, conductor 123, contact members of a relay 124 and a conductor 125 to one of the supply conductors 61. When the circuit breaker 9 is in a circuit-closing position stationary contact members 126 and 127 are connected by a movable member 128 associated with the circuit breaker to complete a circuit through the operating winding of the relay 124 to actuate it to a circuit-closing position. The circuit for operating the relay 124 extends from the supply conductor 60, through a conductor 131, the contact member 126, the movable member 128 the contact member 127 conductor 132, the operating winding of the relay 124 and conductor 125 to the other supply conductor 61. The stationary contact members 108 and 118 of the reversing switches 55 and 56, respectively, are connected by means of conductor 131 to the other supply conductor 60, and are adapted to connect one side of the pilot-motor armature 92 to the supply conductor 60 upon the operation of one of the reversing switches to a second operative position and to connect the other side of the armature 92 to the supply conductor 60 upon the operation of the other reversing switch to a second operative position.

When the electro-magnets of the reversing switches 55 and 56 are unenergized the switches are in the positions illustrated in the drawing, and close a circuit from one side of the armature winding 92, through conductor 94, segment 75 of the transfer switch 65, conductor 95, the contact arm 97 and the contact members 105 and 109 of the reversing switch 55, conductor 122, the contact members 119 and 115 and the contact arm 100 of the reversing switch 56, conductor 99, segment 77 of the transfer switch 65, and conductor 98 to the other side of the armature winding 92 thus closing a dynamic-braking circuit for the motor 54. Upon the operation of the one or the other of the reversing switches to its second operative position, the motor 54 is so connected to the supply conductors 60 and 61 as to be operated in the one or the other direction.

The power factor regulator 57 comprises a contact-making relay having an electro-magnet 135 having a voltage winding 136 centrally disposed between two current windings 139 and 140. The winding 136 is connected to the voltage transformers 137 that are connected across the bus bars 4, 5 and 6 through an adjusting auto-transformer 138. Differentially wound series-connected windings 139 and 140 are disposed on opposite sides of the voltage winding 136 and are adapted to be energized in accordance with the current flowing from the conductors 11 and 12 to the bus bars 4 and 6 through the agency of cross-connected current transformers 141. The core of the electro-magnet 135 actuates a pivoted lever 142 that carries movable contact members 143 and 144 that cooperate, respectively, with stationary contact members 145 and 146.

The winding 136, when energized, sets up a magnetic field which alternately polarizes the electro-magnet 135 in accordance with the instantaneous direction of current flow through the winding, and if energized alone causes the core of the magnet to become centrally disposed within the winding and the point of concentration of the flux created by the winding coincides with the center of the magnet. Since the current windings 139 and 140 are energized by the same current and are differentially wound they produce magnetic fields which balance each other and effect no movement of the magnet. It is thus seen that if the voltage winding 136 and the current windings 139 and 140 are not energized at the same time the magnet 135 remains stationary in its central position.

The voltage winding 136 and the current windings 139 and 140 are so connected to the bus bars that the current flowing through the voltage winding 136 and the currents flowing through the current windings 139 and 140 may have a vector relationship of ninety degrees when the power factor of the circuit is unity, or, one hundred per cent which, of course, prevents any operation of the magnet 135 from its illustrated or mid-position by the joint excitation of the voltage and current windings.

As the power factor of the power delivered to the station from the transmission system varies from unity, either lagging or leading, magnetic fields created by the current and voltage windings occur at the same time, causing the point of concentration of magnetic flux to shift to a new position along the magnet, thereby causing such a movement of the magnet that the center of the magnet shall coincide with the center of the magnetic flux. By shifting the tap connection on the auto-transformer 138 any desired power factor, either lagging or leading, may be maintained on the bus bars.

The regulator 57 is also provided with two windings 148 and 149 symmetrically disposed about the electro-magnet 135 and wound oppositely to the serially-connected windings 139 and 140. One of the windings 148 or 149 is energized from the potential transformers 137 when the one or the other of the reversing switches 55 and 56 is in its second operative position.

Upon the engagement of the contact members 143 and 145 a circuit is completed through the operating winding of the electro-magnet 112 to operate the switch 56 to its second operative position. Upon the engagement of the contact members 144 and 146 a circuit is completed through the operating winding of the electro-magnet 102 to actuate the switch 55 to its second operative position.

The operation of my system is as follows:
When the station is operating disconnected from the transmission system the circuit breaker 9 is in a circuit-opening position, the circuit for operating the relay 124 is open at the contact members 126 and 127 associated with the circuit breaker 9. The relay 124 is held in a circuit opening position by a biasing member 151, thereby interrupting the above traced circuit connecting the reversing switches 55 and 56 to the supply conductor 61, thus removing the control of the motor 54 from the regulator 57.

The vibrating regulator 25 governs the excitation of the generator 2 to maintain the voltage of the bus bars substantially constant as hereinbefore described.

Should it be desired to so change the voltage that the regulator will maintain, the rheostats 47 and 48 may be operated by the motor 54 to adjust the setting of the regulator 25. To control the operation of the motor 54 manually, the transfer switch 65 is moved to the right to thereby transfer the control of the motor to the transfer switch 66, which when moved to the right connects the motor armature across the supply conductors 60 and 61 thus causing the motor to operate the rheostats 47 and 48 in a direction to effect the required adjustment.

The operating circuit for the motor may be traced from the supply conductor 60, through conductor 154, conductor 155, the terminal 85, the movable segment 90 and the terminal 86 of the transfer switch 66, conductor 156, the terminal 74, the movable segment 78, the terminal 73, conductor 157 and the terminal 71 of the transfer switch 65, conductor 98, the armature winding 92, conductor 94, the terminal 68, conductor 158, the terminal 70, the movable segment 76 and the terminal 69 of the transfer switch 65, conductor 159 the terminal 82, the movable segment 88 and the terminal 81 of transfer switch 66 and conductor 160 to the other supply conductor 61.

When it is desired to change the setting of the rheostats 47 and 48 to adjust the setting of the regulator 25 in a direction opposite to that just described, the transfer switch 66 is moved to the left thereby completing a circuit through the armature winding 92 to operate the motor in the opposite direction from that previously described.

The operating circuit for the motor extends from the supply conductor 60, through conductor 154, the terminal 79, the movable segment 87, the terminal 80, conductor 162 and the terminal 82 of the transfer switch 66, conductor 159, the terminal 69, the movable segment 76, the terminal 70, conductor 158 and the terminal 68 of the transfer switch 65, conductor 94, the armature winding 92, conductor 98, the terminal 71, conductor 157, the terminal 73, the movable segment 78, and the terminal 74 of the transfer switch 65, conductor 156, the terminal 86, conductor 163, the terminal 84, the movable segment 89 and the terminal 83 of the transfer switch 66, conductor 164, and conductor 160 to the supply conductor 61.

When it is desired to connect the power station to the transmission system, the transfer switch 65 is turned to the left in order that the motor 54 may be controlled by the reversing switches 55 and 56 and the tap on the auto-transformer 138 is adjusted for the power factor that the regulator 57 is to maintain. The circuit breaker 9 is then closed to connect the bus bars 4, 5 and 6 to the transmission system conductors 11, 12 and 13 and, at the same time to complete the circuit to operate the relay 124, thereby connecting the terminals 109 and 119 of the reversing switches 55 and 56, respectively, to the supply conductor 61.

Should the power factor of the power delivered to the bus bars 4, 5 and 6 from the transmission system be at the value for which the auto-transformer 138 has been set, the magnetic fluxes set up by the current and potential windings will have a ninety degree vector relationship and the regulator lever arm 142 will be in a balanced neutral position.

In case the power factor of the power delivered to the bus bars 4, 5 and 6 is below the value that it is desired to maintain, as determined by the position of the tap connection on the auto-transformer 138, the fluxes produced by the current and voltage windings have a vector relationship less than ninety degrees. The magnetic fields produced by the three windings exist simultaneously, the field produced by the winding 136 opposes that produced by 139 and assists or attracts the field produced by the winding 140 resulting in the point of flux concentration and the electro-magnet 135 moving downwardly.

The downward movement of the electro-magnet 135 effects engagement of the contact members 143 and 145 thereby establishing a circuit through the operating winding of the electro-magnet 112 to operate the switch 56 to its second operative position.

The operating circuit for the electro-magnet 112 extends from the supply conductor 60, through conductor 131 lever arm 142, the contact members 143 and 145, conductor 166, the operating winding of the electro-magnet 112, conductor 167, and conductor 168 to the supply conductor 61.

The reversing switch 56 when actuated to its second operative position separates the contact members 115 and 119 and effects the engagement of the cooperating pairs of contact members 114—118 and 113—117 thereby completing a circuit through armature winding 92 of the motor 54 causing the motor to operate in a direction to change the setting of the regulator 25 to increase the excitation of the generator 3 in order to maintain the power factor of the power delivered from the transmission system to the station at the predetermined value.

The circuit through the armature winding 92 of the motor 54 may be traced from the supply conductor 60, through conductor 131, conductor 171, the cooperating contact members 118 and 114 and the contact arm 100 of the reversing switch 56, conductor 99, the terminal 72, the movable segment 77 and the terminal 71 of the transfer switch 65, conductor 98, the armature winding 92, conductor 94, the terminal 68, the movable segment 75 and the terminal 67 of the transfer switch 65, conductor 95, the contact arm 97 and the contact members 105 and 109 of the reversing switch 55, conductor 122, conductor 123, the lever arm and the cooperating contact members of the relay 124 and conductor 125 to the supply conductor 61.

The contact members 113 and 117 of the reversing switch 56, upon engagement, complete a circuit for energizing the winding 148 of the regulator 57 and as the winding 148 is wound oppositely to the winding 139 it produces a magnetic field opposite in direction to the field produced by the winding 139. The field produced by the winding 148 is similar in function to the fields produced by the differentially related windings 139 and 140, that is to say, it assists or attracts the field produced by the winding 136 causing a movement of the magnet 135 in a direction opposite to that caused by the windings 139 and 140, thereby hastening the disengagement of the contact members 143 and 145 to prevent the regulator from hunting.

The circuit for energizing the winding 148 extends from the neutral point of the secondary windings of the voltage transformers 137, through conductor 173, a resistor 174, conductor 175, conductor 176, the winding 148, conductor 177, the contact members 117 and 113 of the reversing switch 56, conductor 178, conductor 188 and conductor 179 to the auto-transformer 138.

Upon the closure of the circuit breaker 9 should the power factor of the power delivered to the bus bars 4, 5 and 6 from the transmission system be above that which the regulator is to maintain, the magnetic fields produced by the current and voltage windings will have a vector relationship greater than ninety degrees. The interaction of the magnetic fields produced by the voltage winding 136 and the current windings 139 and 140 is such that the field produced by the winding 136 is attracted by the field produced by the winding 139 and is repelled by the field produced by the winding 140, causing the point of flux concentration and the magnet 135 to move upwardly to effect the engagement of the contact members 143 and 144, thereby establishing a circuit through the operating winding of the electro-magnet 102 to operate the switch 55 to its second operative position.

The circuit for operating the electro-magnet 102 extends from the supply conductor 60, through conductor 131, the lever arm 142, the contact members 144 and 146, conductor 181, the operating winding of the electro-magnet 102, conductor 182 and conductor 168 to the supply conductor 61.

Upon the actuation of the reversing switch 55 to its second operative position the cooperating contact members 105 and 109 are separated and the cooperating pairs of contact members 104—108 and 103—107 come into engagement. Upon the engagement of the contact members 104 and 108 a circuit is completed for operating the pilot motor 54 in a direction opposite to that previously described, causing the motor 54 to operate in a direction to so vary the setting of the rheostats 47 and 48 that the regulator 25 effects a decrease in the excitation of the generator 2 to adjust the power factor of the power delivered from the transmission system to the station to the desired value.

The circuit for operating the motor 54 may be traced from the supply conductor 60, through conductor 131, conductor 183, the cooperating contact members 108 and 104 and the contact arm 97 of the reversing switch 55, conductor 95, the terminal 67, the movable segment 75 and the terminal 68 of the transfer switch 65, conductor 94, the armature winding 92, conductor 98, the terminal 71, the movable segment 77 and the terminal 72 of the transfer switch 65, conductor 99, the contact arm 100 and the contact members 115 and 119 of the reversing switch 56, conductor 122, conductor 123, the lever arm and the cooperating contact members of the relay 124 and conductor 125 to the supply conductor 61.

The contact members 103 and 107 of the reversing switch 55, upon engagement, complete a circuit for energizing the winding 149 of the regulator 57 which may be traced from the neutral point of the secondary windings of the voltage transformer 137, through conductor 173, the resistor 174, conductor 175, conductor 186, the winding 149, conductor 187, the contact members 107 and 103 of the reversing switch 55, conductor 188 and conductor 179 to the auto-transformer 138.

The winding 149 being wound in opposition to the winding 140 produces a magnetic field that opposes the field produced by the winding 140 and attracts the field produced by the winding 136 to effect a movement of the magnet 135 in a direction opposite to that caused by the interaction of the magnetic fields produced by the windings 136 and 139 thereby hastening the disengagement of the contact members 144 and 146 to prevent hunting of the regulator.

Since modifications may be made in the apparatus and circuits described without departing from the spirit of my invention, I do not wish to be limited otherwise than by the scope of the appended claims.

I claim as my invention:

1. In a regulator system, in combination, a main power circuit, an auxiliary power circuit adapted to be connected to the main circuit, a dynamo-electric machine connected to the auxiliary circuit, means for regulating the voltage of the auxiliary circuit when it is disconnected from the main circuit, and means for governing the excitation of the dynamo-electric machine to maintain a predetermined power factor on the auxiliary circuit when it is connected to the main circuit.

2. In a regulator system, in combination, a main power circuit, an auxiliary power circuit adapted to be connected to the main circuit, a synchronous generator connected to the auxiliary power circuit, means for governing the excitation of the generator to regulate the voltage of the auxiliary power circuit when it is disconnected from the main circuit, and means for governing the excitation of the generator to regulate the power factor of the auxiliary power circuit when it is connected to the main circuit.

3. In a regulator system, in combination, a main power circuit, an auxiliary power circuit having a synchronous generator connected thereto, means for connecting the auxiliary circuit to the main circuit, a voltage regulator for governing the excitation of the generator to control the voltage of the auxiliary circuit when it is disconnected from the main circuit, means comprising a power factor regulator for maintaining a predetermined power factor at a selected portion of the auxiliary circuit, and means for rendering the power factor regulator effective only when the two circuits are connected together.

4. In a regulator system, a synchronous generator for supplying power to a load, a power circuit, switch means for connecting said power circuit to said generator for also supplying power to said load, a regulator responsive to the voltage of said generator for governing the excitation thereof, a regulator responsive to the power factor of the circuit through said switch means for governing the excitation of said generator, and means effective upon the closing of said switch means for transferring the control of the excitation of the generator from said voltage regulator to said power factor regulator.

5. In a regulator system, in combination, a main power circuit, an auxiliary power circuit having a dynamo-electric machine connected thereto, means for connecting the two circuits together, a regulator responsive to an electrical quantity of the auxiliary circuit for governing the excitation of the dynamo-electric machine, means associated with the regulator and adapted to influence it to vary the excitation of the dynamo-electric machine, a regulator responsive to the power factor of the auxiliary circuit for controlling the operation of the regulator influencing means and means associated with said circuit connecting means for rendering the power factor regulator ineffective when said main and auxiliary circuits are not connected together.

6. In a regulator system, in combination an auxiliary power circuit having a dynamo-electric machine connected thereto, a main power circuit and means for connecting the two circuits together, a regulator responsive to an electrical quantity of the auxiliary circuit for governing the excitation of the dynamo-electric machine means connected in the regulator control circuits and adapted to modify the action of the regulator to vary the excitation of the dynamo-electric machine, a regulator responsive to the power factor of the auxiliary circuit for controlling means to operate the regulator modifying means, means associated with said circuit connecting means for interrupting the power factor regulator control when the circuits are disconnected.

7. In a regulator system, in combination, an auxiliary electric circuit, a dynamo-electric machine connected thereto, a main electric circuit, means for interconnecting the two circuits, regulator means responsive to an electrical quantity of the auxiliary circuit for governing the excitation of the dynamo-electric machine, means associated with the regulator to bias its action to vary the excitation of the dynamo-electric machine, a motor for operating the regulator biasing means, means for controlling the operation of the motor when the circuits are disconnected, a regulator responsive to the power factor of the auxiliary circuit for controlling the operation of the motor, means for transferring the control of the motor to either of the motor control means and means for rendering the power factor regulator ineffective when the circuits are disconnected.

8. In a regulator system, in combination, an auxiliary electric circuit, a dynamo-electric machine connected thereto, a main electric circuit, means for interconnecting the two circuits, a regulator responsive to an electrical quantity of the auxiliary circuit for governing the excitation of the dynamo-electric machine, means connected in the regulator control circuits to modify its action to vary the machine excitation, a motor for operating the regulator modifying means, means for controlling said motor, a second motor control means comprising a regulator responsive to the power factor of the auxiliary circuit, switching means for transferring the control of the motor to either control means, means for rendering the power factor regulator control effective only when the circuits are interconnected.

9. In a regulator system, in combination, an auxiliary electric circuit, a dynamo-electric machine connected thereto, a main electric circuit, means for interconnecting the two circuits, a regulator responsive to an electrical quantity of the auxiliary circuit for governing the excitation of the dynamo-electric machine, means connected in the regulator control circuits to modify its action to vary the machine excitation, a motor for operating the regulator modifying means, motor control means, a second motor control means comprising a regulator responsive to the power factor of the auxiliary circuit, switching means for transferring the control of the motor to either control means, means for rendering the power factor regulator control effective only when the circuits are interconnected and anti-hunting means associated with the power factor regulator.

In testimony whereof, I have hereunto subscribed my name this 6th day of November, 1930.

JOHN H. ASHBAUGH.